United States Patent [19]

Teng

[11] Patent Number: 5,201,263

[45] Date of Patent: Apr. 13, 1993

[54] COOKING UTENSIL WITH BUILT-IN AUTOMATIC STIRRING DEVICE

[76] Inventor: Andy C. Teng, 7th Fl., No. 431, Chung-Shaio E. Rd., Sec. 5, Taipei City, Taiwan

[21] Appl. No.: 897,435

[22] Filed: Jun. 12, 1992

[51] Int. Cl.⁵ .................... A47J 27/00; A47J 36/32; B01F 7/16; B01F 7/20
[52] U.S. Cl. ........................................ 99/335; 99/344; 99/348; 366/130; 366/142; 366/247; 366/249; 366/252; 366/286; 366/289; 366/312
[58] Field of Search ................ 99/344, 348, 327, 332, 99/335; 366/65, 98, 130, 142, 247-251, 252-254, 285, 286, 289, 331, 332, 333, 279, 309, 312, 344

[56] References Cited

U.S. PATENT DOCUMENTS

| | | |
|---|---|---|
| 817,310 | 4/1906 | Forbes ................................. 366/289 |
| 2,007,361 | 7/1935 | Berger ................................. 366/249 |
| 3,285,584 | 11/1966 | Goldfarb ............................. 366/252 |
| 3,783,770 | 1/1974 | Aries ................................... 366/249 |
| 4,067,551 | 1/1978 | Reilly .................................. 366/332 |
| 4,380,399 | 4/1983 | Godat et al. ........................ 366/309 |
| 4,576,089 | 3/1986 | Chauvin .............................. 366/142 |
| 4,763,567 | 8/1988 | Dalquist, III et al. ................ 99/348 |
| 4,854,718 | 8/1989 | Wang .................................. 366/252 |
| 4,946,286 | 8/1990 | Purkapile ............................ 366/247 |
| 5,013,158 | 5/1991 | Tarlow ................................. 366/251 |

Primary Examiner—Timothy F. Simone
Attorney, Agent, or Firm—Morgan & Finnegan

[57] ABSTRACT

A cooking utensil with a built-in automatic stirring device includes a pot body and a cover which is provided on an open top of the pot body and which confines an enclosed space. A rotary knob is rotatably mounted on the cover and has an axial shaft which extends into the enclosed space. The rotary knob is rotated so as to set a desired stirring method. A gear set is provided inside the enclosed space and rotates with the axial shaft of the rotary knob. A stirring implement has a shaft portion which is rotatably driven by the gear set and which extends into the pot body. The shaft portion has a lower end which is disposed adjacent to a closed bottom of the pot body and which is provided with at least one radially extending stirring blade. A spiral spring is connected to the gear set and is wound when the rotary knob is rotated. The spiral spring gradually unwinds to drive rotatably the gear set and cause axial rotation of the stirring implement for the duration of the stirring period.

9 Claims, 5 Drawing Sheets

COOKING UTENSIL WITH BUILT-IN AUTOMATIC STIRRING DEVICE

BACKGROUND OF THE INVENTION

1. Field of the Invention

The invention relates to a cooking utensil, more particularly to a cooking utensil with a built-in automatic stirring device.

2. Description of the Related Art

Continuous manual stirring of the contents of a cooking utensil is necessary when stewing or when cooking thick soup with a heavy concentration of solid food. Such stirring activity is required so that heat may be evenly distributed to prevent scorching of the solid food and to prevent the solid food from sticking onto the bottom of the cooking utensil. Manual stirring of the contents of the cooking utensil, however, is tiring and time consuming. Hence, there is a need to provide a cooking utensil which is capable of stirring automatically the contents therein.

SUMMARY OF THE INVENTION

Therefore, the objective of the present invention is to provide a cooking utensil with a built-in automatic stirring device which is capable of stirring automatically the contents therein so as to prevent scorching of solid food and to prevent the solid food from sticking onto the bottom of the cooking utensil.

Accordingly, the preferred embodiment of a cooking utensil with a built-in automatic stirring device of the present invention comprises:

a pot body having an open top and a closed bottom;

a cover provided on the open top of the pot body and confining an enclosed space;

a rotary knob rotatably mounted on the cover and having an axial shaft which extends into the enclosed space, said rotary knob being rotated manually in a first direction so as to set a desired stirring period;

a gear set provided inside the enclosed space and rotating with the axial shaft of the rotary knob;

a stirring implement having a shaft portion which is rotatably driven by the gear set and which extends into the pot body, said shaft portion having a lower end which is disposed adjacent to the closed bottom of the pot body and which is provided with at least one radially extending stirring blade; and a spiral spring means connected to the gear set and wound when the rotary knob is rotated in the first direction, said spiral spring means gradually unwinding to drive rotatably the gear set and cause axial rotation of the stirring implement for the duration of the stirring period.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
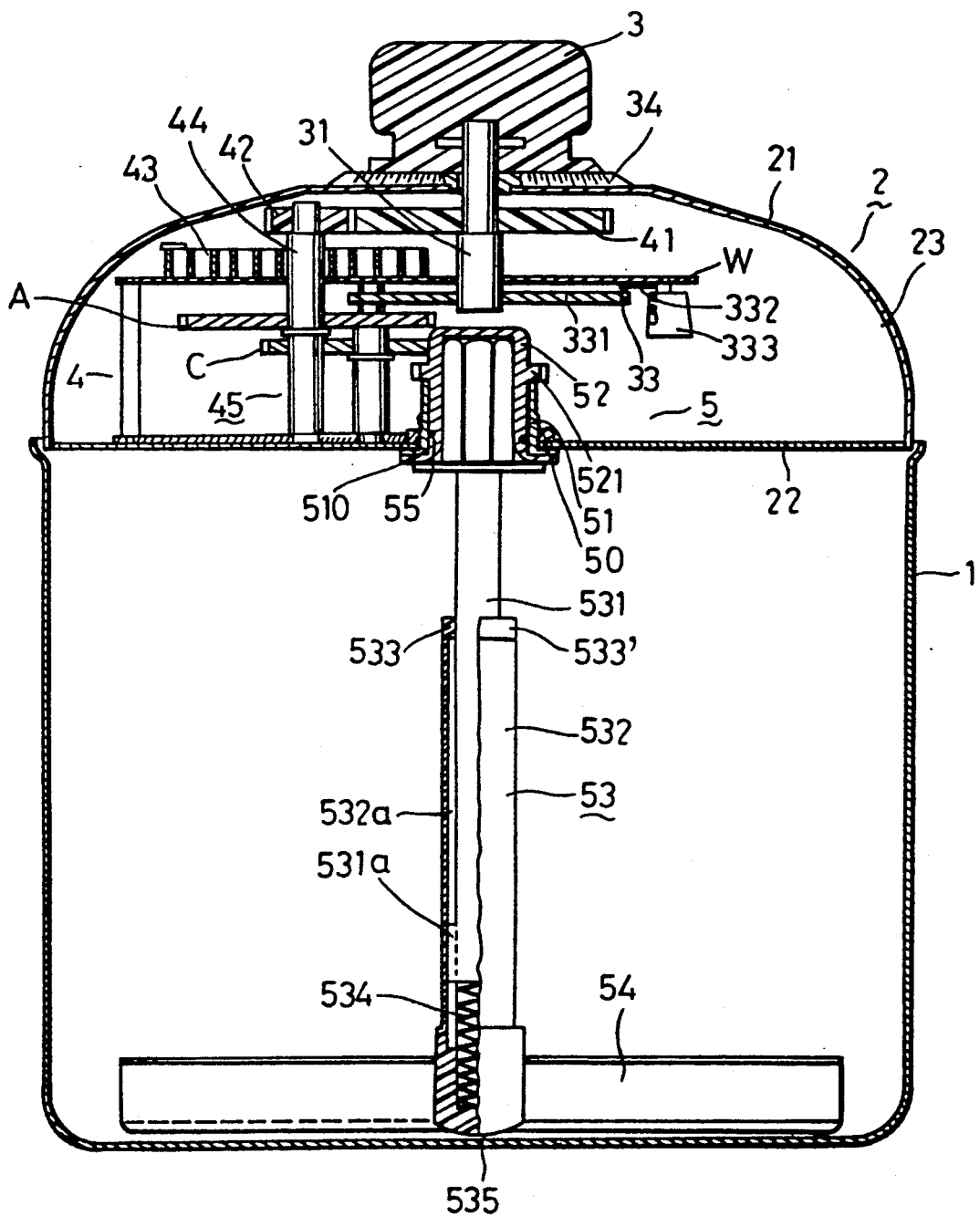
FIG. 1 is a sectional view of the preferred embodiment of a cooking utensil with a built-in automatic stirring device according to the present invention.

Referring to FIG. 1, the preferred embodiment of a cooking utensil with a built-in automatic stirring device according to the present invention is shown to comprise a pot body (1), a cover (2), a rotary knob (3), a gear set (4) and a stirring implement (5). The gear set (4) and the stirring implement (5) are preferably made of a safe and high temperature-resistant plastic material.

The pot body (1) is a rounded container which is used when cooking or boiling. The cover (2) is adapted to cover an open top of the pot body (1) and includes a substantially dome-shaped part (21) and a base plate (22) which has a peripheral edge that is sealed to the bottom edge of the dome-shaped part (21). The dome-shaped part (21) and the base plate (22) cooperatively define an enclosed space (23). The rotary knob (3) is rotatably mounted on the top end of the dome-shaped part (21) and has an axial shaft (31) which extends into the enclosed space (23). The top end of the dome-shaped part (21) is further provided with graduations (34) for indicating the stirring time which corresponds to an angle of rotation of the rotary knob (3).

The gear set (4) is provided inside the enclosed space (23) and includes a first gear (41) axially mounted on and rotating with the axial shaft (31) of the rotary knob (3). The first gear (41) meshes with a second gear (42). The second gear (42) and a spiral spring (43) are mounted axially on an axle (44). When the rotary knob (3) is manually driven to rotate in a first direction so as to set a desired stirring period, the first and second gears (41, 42) and the axle (44) correspondingly rotate to wind the spiral spring (43).

Figure 2:
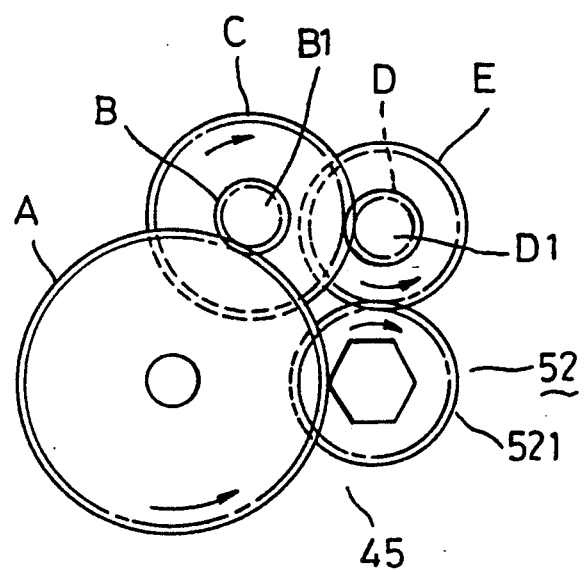
FIG. 2 is a top view illustrating how a gear set of the preferred embodiment rotatably drives a stirring implement.

Referring to FIGS. 1 and 2, a secondary gear set (45) is similarly provided inside the enclosed space (23) below the first and second gears (41, 42) and the spiral spring (43). The secondary gear set (45) has a first sprocket (A) which is mounted axially on and which is rotatably driven by the axle (44). The first sprocket (A) meshes with a second sprocket (B). The second sprocket (B) and a third sprocket (C) are mounted axially on a first axle (B1). The third sprocket (C) meshes with a fourth sprocket (D). The fourth sprocket (D) and a fifth sprocket (E) are mounted axially on a second axle (D1). Rotation of the fifth sprocket (E) rotatably drives the stirring implement (5). The unwinding action of the spiral spring (43) rotatably drives the secondary gear set (45) to cause the rotation of the stirring implement (5) for the duration of the stirring period.

The stirring implement (5) includes a mounting nut (50), a tubular mounting sleeve (51), a mounting cap (52), a shaft portion (53) and stirring blades (54). The mounting sleeve (51) has a threaded outer surface and a lower end which is provided with a radial outward flange (510). The mounting sleeve (51) extends through a central opening formed in the base plate (22) and is retained therein by the mounting nut (50). The mounting cap (52) extends rotatably into the mounting sleeve (51) and is formed with radial gear teeth (521) which are supported on the top end of the mounting sleeve (51). The radial gear teeth (521) mesh with the fifth sprocket (E). An O-shaped sealing ring (55) is provided between the mounting sleeve (51) and the mounting cap (52) to prevent the entry of water vapor into the enclosed space (23). The shaft portion (53) has a hexagonal head which extends into a hexagonal blind bore in the mounting cap (52). Rotation of the mounting cap (52) can therefore cause corresponding axial rotation of the shaft portion (53). The stirring blades (54) extend radially outward from the lower end of the shaft portion (53). Rotation of the fifth sprocket (E) causes corresponding rotation of the mounting cap (52), the shaft portion (53) and the stirring blades (54). This illustrates how the contents of the cooking utensil of the present invention is automatically stirred.

Figure 3:
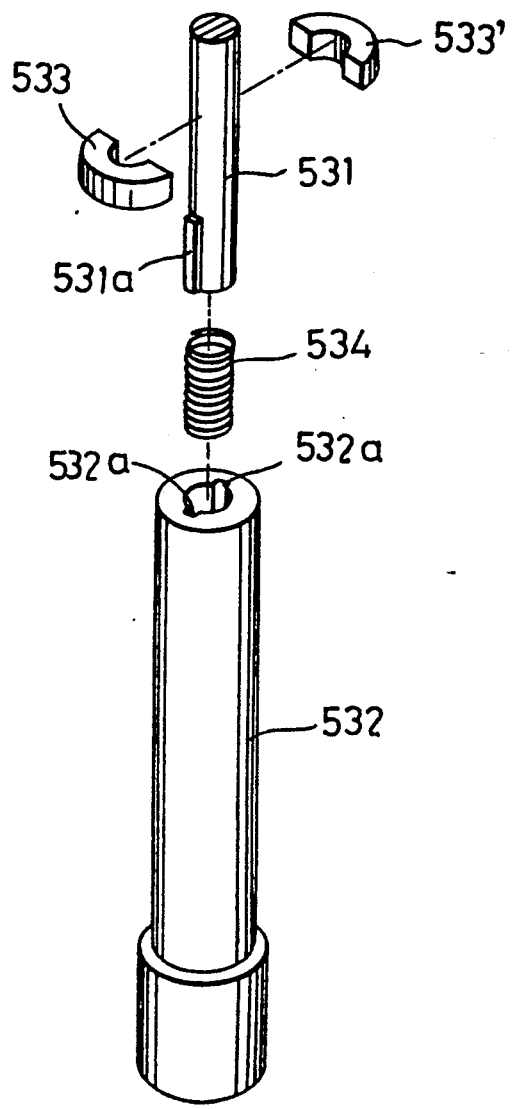
FIG. 3 is an exploded view of the shaft portion of the stirring implement of the preferred embodiment.

Note that the shaft portion (53) can be easily detached from the mounting cap (52). The length of the shaft portion (53) can be adjusted so as to fit pot bodies of different sizes. Referring to FIGS. 1 and 3, the shaft portion (53) includes an inner shaft (531) and an outer tubular shaft (532) which slidably receives the inner shaft (531). The lower end of the inner shaft (531) is formed with a pair of axially extending projections (531a). The inner surface of the outer shaft (532) is formed with a pair of axially extending grooves (532a) which slidably receive the projections (531a). This permits the outer shaft (532) to rotate simultaneously with the inner shaft (531). A compression spring (534) is provided inside the outer shaft (532) and biases a rounded closed bottom (535) of the outer shaft (532) away from the lower end of the inner shaft (531) so as to contact the closed bottom of the pot body (1). The spring (535) permits adjustments in the length of the shaft portion (53) so as to correspond with the depth of the pot body (1). A pair of curved retaining pieces (533, 533') are attached to the top end of the outer shaft (532). The retaining pieces (533, 533') prevent the detachment of the inner shaft (531) from the outer shaft (532).

Figure 4:
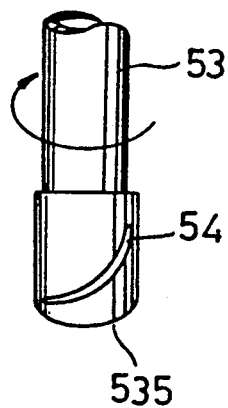
FIG. 4 is a side view of the lower portion of the stirring implement of the preferred embodiment.

The stirring blades (54) extend radially outward from the bottom (535) of the outer shaft (532). Referring to FIG. 4, the stirring blades (54) are preferably curved to enhance the stirring effect provided by the same.

Figure 5:
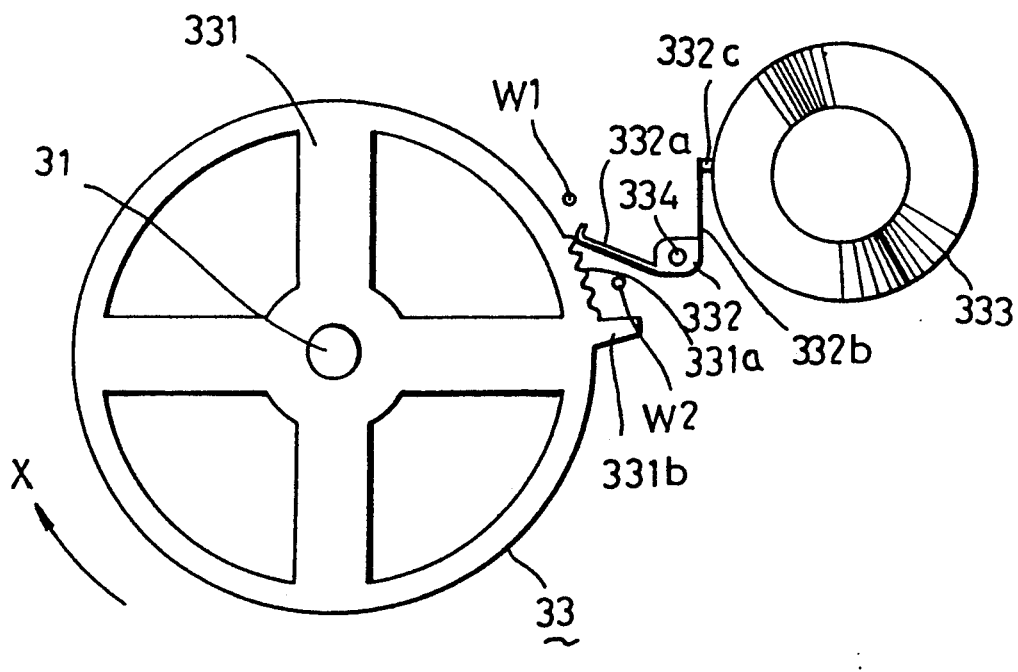
FIG. 5 is a top view of an alarm unit of the preferred embodiment.

Referring to FIGS. 1 and 5, an alarm unit (33) is provided inside the enclosed space (23) on the lower end of the axial shaft (31) of the rotary knob (3). The alarm unit (33) includes a wheel (331) and a hammer unit (332) which is driven by the wheel (331) to strike a bell (333). The bell (333) is suspended on a horizontally disposed support plate (W). The hammer unit (332) is pivotably mounted on a pivot shaft (334) which extends downwardly from the support plate (W). The hammer unit (332) has a first arm (332a) which extends horizontally towards the wheel (331) and then downwardly so as to contact the wheel (331). The hammer unit (332) further has a bent second arm (332b) which is provided with a stud (332c) for striking the bell (333).

The first arm (332a) of the hammer unit (332) normally contacts a toothed portion (331a) of the wheel (331) when the preferred embodiment is not in use, i.e., when the spiral spring (43) is in an unwound state. The wheel 331) is further provided with a radial projection (331b) adjacent to one end of the toothed portion (331a).

Referring to FIG. 5, rotation of the rotary knob (3) in the direction indicated by an arrow (X) causes the spiral spring (43) to wind and move the toothed portion (331a) of the wheel (331) away from the first arm (332a) of the hammer unit (33). As the spiral spring (43) unwinds to commence stirring, the wheel (331) slowly rotates in a direction opposite to that indicated by the arrow (X). When the stirring period is almost over, the toothed portion (331a) of the wheel (331) contacts the first arm (332a) of the hammer unit (332, thereby causing the hammer unit (332) to pivot and permit the stud (332c) to strike repeatedly the bell (333). This illustrates how the preferred embodiment generates an alarm sound to indicate that the stirring period has almost expired.

The support plate (W) is further provided with a pair of downwardly extending limiting stubs (W1, W2). The limiting stub (W1) and the radial projection (331b) control the maximum angle of rotation of the wheel (331). The limiting stub (W2) can prevent the first arm (332a) of the hammer unit (332) from latching onto the radial projection (331b).

It is important to note that the unwinding action of the spiral spring (43) is irregular, that is, the spiral spring (43) initially unwinds at a faster rate which gradually slows down as the reserved spring force thereof diminishes. This can result in an uneven stirring action of the stirring implement (5). A braking unit (6) is incorporated in the gear set (4) in order to overcome this defect.

Figure 6:
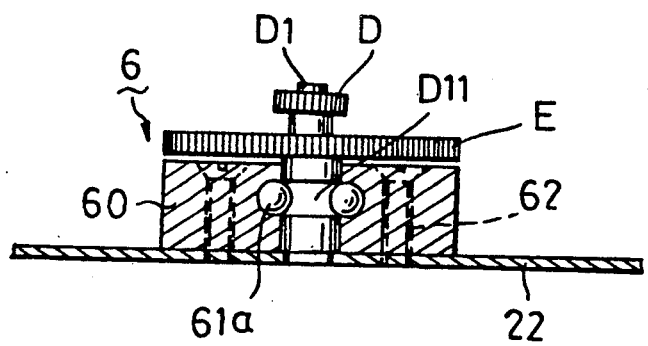
FIG. 6 is a side view of a braking unit of the preferred embodiment.
Figure 7:
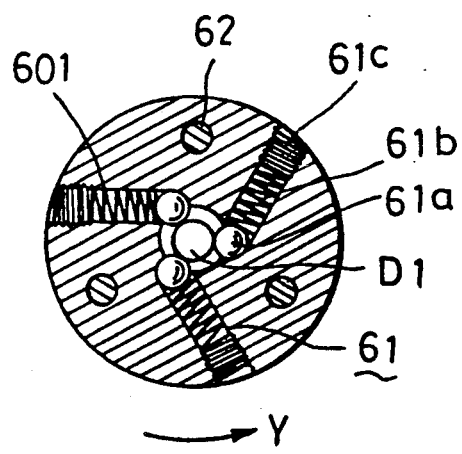
FIG. 7 is a top view of the braking unit shown in FIG. 6.

Referring to FIG. 6, the braking unit (6) is mounted on the second axle (D1) of the secondary gear set (45) below the fifth sprocket (E). FIG. 7 is a top view of the braking unit (6). The braking unit (6) includes a cylindrical body (60) of appropriate height, three rivets (62) for securing the cylindrical body (60) on the base plate (22) and three spring-loaded buffer units (61).

The cylindrical body (60) is formed with an axial bore which receives the lower end of the second axle (D1). The lower end of the second axle (D1) is formed with an annular groove (D11) which has a rounded curvature. The cylindrical body (60) is further formed with three bores 601) which are coplanar with the annular groove (D11) and which have axes that are preferably tangent to the smallest diameter of the second axle (D1) at the annular groove (D11). The outermost end of each of the bores (601) is formed with an internal screw thread. Each of the buffer units (61) is received in a respective one of the bores (601) and includes a steel ball (61a), a compression spring (61b) and a sunk-head screw (61c). The compression spring (61b) is provided between the steel ball (61a) and the screw (61c) and biases the steel ball (61a) to extend into the annular groove (D11) and abut tightly against the second axle (D1).

Referring to FIG. 7, when the second axle (D1) rotates in the direction indicated by an arrow (Y), the steel balls (61a) are biased by the springs (61b) so as to apply dynamic friction on the second axle (D1). The faster the rotation of the second axle (D1), the greater is the friction applied thereto. This illustrates how the braking unit (6) regulates the unwinding action of the spiral spring (43) so as to obtain an effective stirring action.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A cooking utensil with a built-in automatic stirring device, comprising:

a pot body having an open top and a closed bottom;

a cover provided on said open top of said pot body and confining an enclosed space, wherein said cover comprises a substantially dome-shaped part with a bottom edge and a base plate which has a peripheral edge that is sealed to said bottom edge of said dome-shaped part;

a rotary knob rotatably mounted on said cover and have an axial shaft which extends into said enclosed space, said rotary knob being rotated manually in first direction so as to set a desired stirring period;

a gear set provided inside said enclosed space and rotating with said axial shaft to said rotary knob;

a stirring implement having a shaft portion which is rotatably driven by said gear set and which extends into said pot body, said shaft portion of said stirring implement having an upper end which extends through said base plate and into said enclosed space so as to be rotatably driven by said gear set, said shaft portion having a lower end which is disposed adjacent to said closed bottom of said pot body and which is provided with at least one radially extending stirring blade, wherein said stirring implement further comprises a mounting cap rotatably mounted on said base plate and meshing with said gear set, said mounting gap detachably engaging said upper end of said shaft portion; and a spiral spring means connected to said gear set and wound when said rotary knob is rotary know is rotated in the first direction, said spiral spring means gradually unwinding to drive rotatably said gear set and cause axial rotation of said stirring implement for the duration of the stirring period.

2. The cooking utensil with a built-in automatic stirring device as claimed in claim 1, wherein said shaft portion of said stirring implement has a length which can be adjusted so as to correspond with the depth of said pot body.

3. The cooking utensil with a built-in automatic stirring device as claimed in claim 2, further comprising an alarm sound generating means provided inside enclosed space and driven by said axial shaft to said rotary knob so as to generate an alarm sound when the stirring period is almost over.

4. The cooking utensil with a built-in automatic stirring device as claimed in claim 3, wherein said alarm sound generating means comprises a bell and a hammer means driven by axial shaft of said rotary knob so as to strike said bell when the stirring period is almost over.

5. The cooking utensil with a built-in automatic stirring device as claimed in claim 2, further comprising a braking means for controlling the speed of rotation of said stirring implement.

6. The cooking utensil with a built-in automatic stirring device as claimed in claim 1, wherein said shaft portion of said stirring implement comprises:

an inner shaft rotatably driven by said gear set;

an outer tubular shaft slidably receiving said inner shaft and rotatably driven by said inner shaft, said outer shaft having a closed bottom; and a compression spring means provided inside said outer shaft to bias said closed bottom of said outer shaft away from said inner shaft so as to contact said closed bottom of said pot body.

7. The cooking utensil with a built-in automatic stirring device as claimed in claim 1, further comprising an alarm sound generating means provided inside said enclosed space and driven by said axial shaft of said rotary knob so as to generate an alarm sound when the stirring period is almost over.

8. The cooking utensil with a built-in automatic stirring device as claimed in claim 7, wherein said alarm sound generating means comprises a bell and a hammer means driven by axial shaft of said rotary knob so as to strike said bell when the stirring period is almost over.

9. The cooking utensil with a built-in automatic stirring device as claimed in claim 1, further comprising a braking means for controlling the speed of rotation of said stirring implement.

* * * * *